United States Patent [19]
Sobey et al.

[11] 3,759,566
[45] Sept. 18, 1973

[54] VEHICLE BODY CONSTRUCTION

[75] Inventors: Albert J. Sobey; Norman McQueen; Robert R. Larsen, all of Bloomfield Hills, Mich.

[73] Assignee: Transportation Technology, Inc., Madison Heights, Mich.

[22] Filed: July 28, 1971

[21] Appl. No.: 167,016

Related U.S. Application Data

[63] Continuation of Ser. No. 835,403, May 9, 1969, abandoned.

[52] U.S. Cl. ............... 296/28 R, 180/1, 105/341, 296/64, 296/155, 180/116
[51] Int. Cl. ......................... B60v 1/18, B60n 1/00
[58] Field of Search ................. 296/1, 28 C, 28 R, 296/64, 148, 155; 180/125, 116, 124; 105/339, 341

[56] References Cited
UNITED STATES PATENTS

| | | | |
|---|---|---|---|
| 3,467,026 | 9/1969 | Broggie et al. | 105/341 |
| 3,360,295 | 12/1967 | Reynolds | 296/28 C |
| 987,123 | 3/1911 | Fleischer | 105/339 |
| 943,007 | 12/1909 | Dahlin et al. | 105/339 |
| 1,074,078 | 9/1913 | Wright | 296/155 |
| 2,533,752 | 12/1950 | Alamagny | 296/1 X |
| 3,246,712 | 4/1966 | Mackie | 180/124 X |

FOREIGN PATENTS OR APPLICATIONS

| | | | |
|---|---|---|---|
| 598,633 | 2/1948 | Great Britain | 296/1 |
| 519,152 | 3/1955 | Italy | 296/155 |
| 673,878 | 10/1929 | France | 296/155 |
| 638,046 | 11/1936 | Germany | 296/64 |
| 1,424,500 | 12/1965 | France | 296/155 |

Primary Examiner—Kenneth H. Betts
Attorney—Barnard, McGlynn & Reising

[57] ABSTRACT

A low-profile vehicle body for passenger carrying vehicles particularly suitable for use in transportation systems in major activity centers. The vehicle body includes a base portion with enclosure means cooperating therewith to define a passenger compartment of low-profile for comfortably seating passengers, and in which the passengers can quickly and easily enter and leave the passenger compartment in an upright or standing position. The access opening to the passenger compartment is closed during transit by a movable section having a top portion forming a portion of the roof of the passenger compartment and a pair of side portions depending from the top portion forming at least a portion of the side walls of the passenger compartment.

8 Claims, 7 Drawing Figures

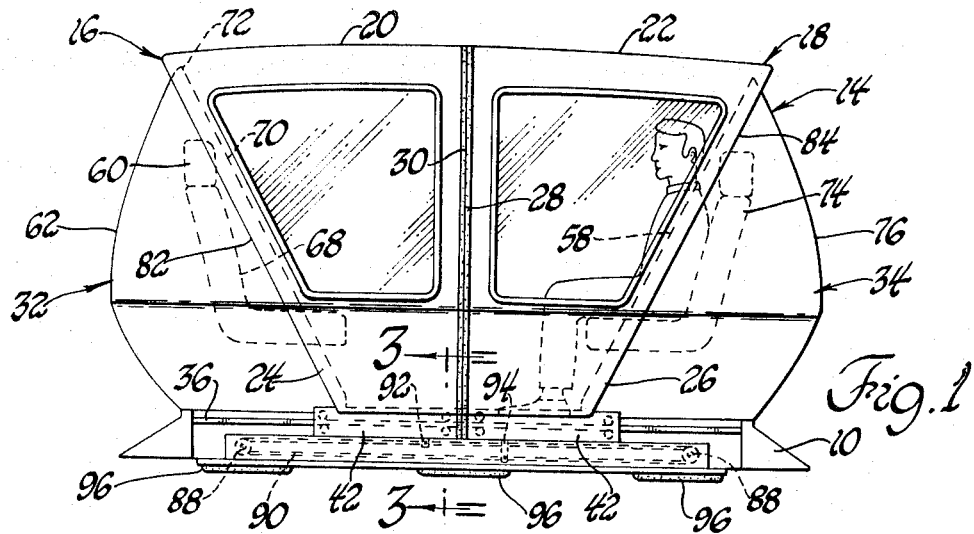
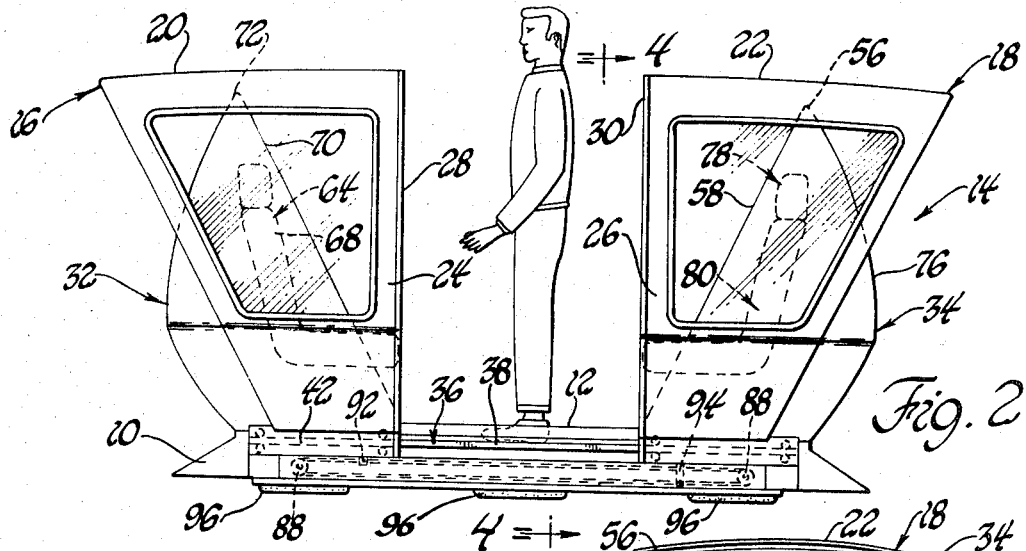
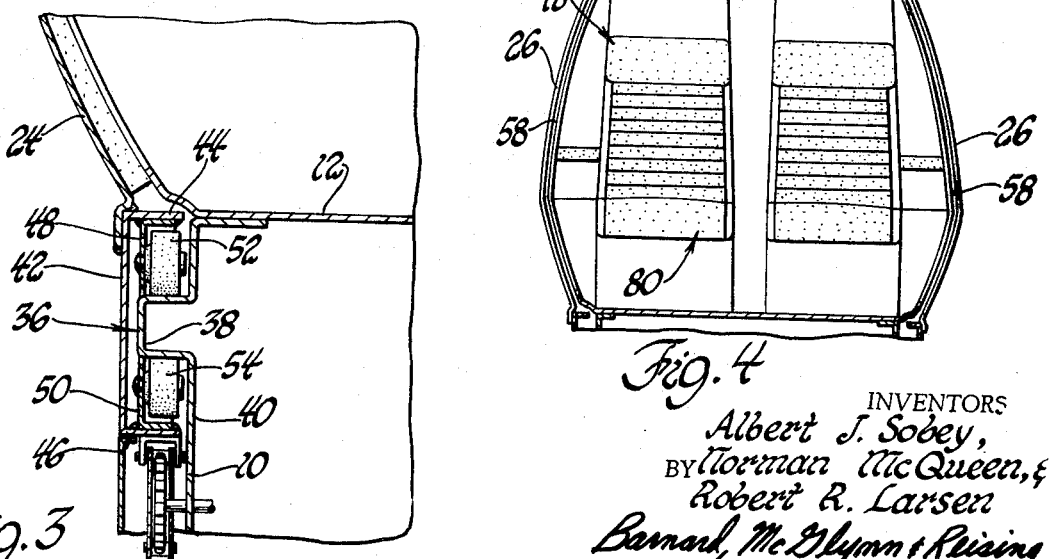

VEHICLE BODY CONSTRUCTION

This application is a continuation of application Ser. No. 835,403 filed May 9, 1969, now abandoned.

This invention relates generally to the construction of vehicle bodies, and is particularly concerned with vehicles for carrying passengers in transportation systems in centers of major activity for transporting passengers over planned routes, and wherein the passengers may be seated comfortably in the vehicle having a low profile, but wherein the passengers can stand up to enter and leave the vehicle so as to have easy access to the passenger compartment.

A growing need has developed in recent years for transportation systems in shopping centers, large university campuses, industrial complexes, parks and other centers of major activity for moving individuals or small groups of passengers from one point to another over planned routes. Such systems may include tracks or guideways which pass under buildings, through tunnels, and beneath low overheads. When the vehicles are at loading and unloading terminals or docks, it is desirable for the passengers to be able to enter and leave the vehicle quickly and conveniently. The vehicle should have omnidirectional capability for maximum efficiency in large volume distribution systems.

Amount types of transportation systems proposed in recent years are those which include ground effect or air cushion vehicles which are supported above the surface on a pad or film of air and are propelled by linear motors and the like. See, for example, U.S. Pat. Nos. 3,357,511 and 3,385,228.

An object of this invention is therefore to provide a passenger vehicle body having a low profile for comfortably seating passengers in a completely enclosed passenger compartment during transit, but wherein the passengers can enter and leave the vehicle while erect.

Still another object is to provide a vehicle body for passenger carrying vehicles particularly suitable for use in transportation systems wherein the vehicle can travel over a route extending beneath low overheads, underneath buildings, and through tunnels and the like, and wherein the passengers can enter and leave the passenger compartment of the vehicle from a standing up position, and wherein the passengers may be seated in a completely enclosed passenger compartment during transit.

Still another object is to provide an air cushion supported vehicle body for use in transportation systems in which the vehicle must pass beneath low overheads and accordingly must have a low profile during transit and wherein the vehicle has a completely enclosed passenger compartment for comfortably seating passengers during transit but in which the passengers can quickly and easily enter and leave the vehicle while standing.

In carrying out the foregoing, and other objects, a vehicle body according to the present invention includes a base portion having a horizontal floor surface with enclosure means cooperating with the base portion to define a passenger compartment. The enclosure means includes a pair of movable sections each having a top portion and a pair of side portions depending therefrom, the movable sections having opposed, inner edges and being movable relative to each other between a closed position in which the opposed inner edges are engaged with each other such that the top portions define at least a portion of the roof of the passenger compartment and the side portions define at eleast a portion of the opposite side walls of the passenger compartment, and an open position in which the opposed inner edges of the movable sections are separated to permit unobstructed ingress and egress to the passenger compartment between the spaced inner edges of the movable sections.

In one embodiment of the invention, the vehicle body includes a base portion with a horizontal floor surface with air cushion devices mounted on the base portion for supporting the base portion above the surface over which the vehicle travels. A pair of axially spaced, complementary end sections are mounted on each end of the base and project upwardly therefrom to define end walls of a passenger compartment. Defined on each side of the base portion between the end section is a track, and a pair of movable closure sections each having a top portion and a pair of side portions depending therefrom are mounted on the vehicle with the lower end of the side portions slidably mounted on the tracks. The closure sections are thus movable between a closed position in opposed, end-to-end engagement to cooperate with the end sections and completely enclose the passenger compartment, and an open position in which the closure sections are axially spaced from each other and straddle the respective end sections to provide unobstructed access to the passenger compartment from either side thereof.

In another embodiment, the vehicle body includes a base portion with a horizontal floor surface and air cushion devices mounted on the base portion for supporting the base portion above the surface over which the vehicle travels. A pair of complementary, open-ended shell sections are mounted on the base portion, and each of the shell sections have a top portion, a pair of side portions depending therefrom, and an end portion depending from the top portion and extending between the side portions. The shell sections are slidably mounted on the base portion in opposed axial relationship for movement between a closed position in which the edges of the top and side portions surrounding the open ends are in opposed abutting relationship to completely enclose a passenger compartment with the base portion, and an open position in which the open ends of the shell sections are axially spaced from each other to provide unobstructed ingress and egress to the passenger compartment from either side of the base.

Other objects, advantages and features of the invention will become apparent from the following description taken in connection with the accompanying drawings in which:

FIG. 1 is an elevational view of a vehicle body embodying the ivention wherein the passenger compartment of the vehicle is completely enclosed for transit;

FIG. 2 is a view similar to FIG. 1 with the passenger compartment opened to provide unobstructed access to the passenger compartment;

FIG. 3 is a sectional detailed view taken on line 3—3 of FIG. 1;

FIG. 4 is a sectional view taken on line 4—4 of FIG. 2;

Figure 5:
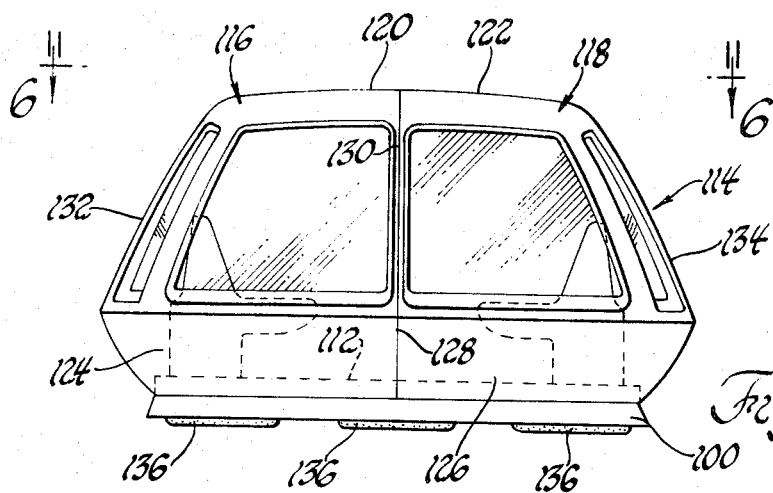
FIG. 5 is an elevational view of a second embodiment of the invention.

FIGS. 1 through 4 illustrate a vehicle body comprising a base portion 10 having a horizontal floor surface 12. Enclosure means designated collectively by reference numeral 14 cooperates with the base portion 10 to define a passenger compartment with the base portion. Enclosure means 14 includes a pair of movable sections 16 and 18 each having a top portion 20 and 22, respectively, which extends across the width of the base portion 10 substantially overlying the floor surface 12. A pair of side portions 24 depend from each side of the top portion 20, and a pair of similar side portions 26 depend from the top portion 22 of the movable section 18. The movable sections 16 and 18 have opposed inner edges 28 and 30, respectively, and are movable relative to each other between closed and open positions. As shown in FIG. 1, in the closed position the opposed inner edges 28 and 30 are engaged with each other such that the top portions 20 and 22 define at least a major portion of the roof of the passenger compartment, and the side portions 24 and 26 define a major portion of the opposite side walls of the passenger compartment. In the open position as shown in FIG. 2, the opposed inner edges 28 and 30 of the movable sections 16 and 18, respectively, are separated to permit unobstructed ingress and egress to the passenger compartment between the spaced inner edges 28 and 30 of the movable sections 16 and 18.

The enclosure means 14 of the vehicle body of FIGS. 1 through 4 further include portions 32 and 34 defining end walls for the passenger compartment. Tracks 36 are defined on each side of the base portion between the end walls of the passenger compartment, and each side portion 24 and 26 of the movable sections 16 and 18 are slidably mounted on one of the tracks 36. A suitable construction for the track 36 is shown in FIG. 3 wherein a longitudinal rail member 38 is formed in the side portion 40 of the base portion 10, the rail 38 projecting laterally outwardly from the side portion 40.

Mounted on the lower end of each of the side portions 24 is a carriage 42 including a channel having upper and lower horizontal flanges 44 and 46, respectively. Angle sections 48 and 50 welded respectively to flanges 44 and 46 support rollers 52 and 54 engageable with the upper and lower sides, respectively, of rail 38 for slidably supporting the movable section 16 on rail 38. An identical carriage 42 is mounted on the lower ends of the side portions 26 of movable section 18.

In the embodiment of FIGS. 1 through 4, portions 32 and 34 defining the end walls of the passenger compartment are each fixed to and project upwardly from the base portion. Each of the movable sections 16 and 18 straddles the associated body portions 32 and 34 in the open position as shown in FIG. 2 such that the outer surface or edge portion of the associated body portion is received within the space bounded by the inner surface of the movable section. For example, as shown in FIG. 4, the end section 34 has a top peripheral edge 56 and side peripheral edges 58 which are received within the space bounded by the top portion 22 and side portions 26, respectively, of the movable section 18.

The body portion 32 has side wall portions 60 extending from the end wall 62 thereof to define therewith a passenger seat receiving space designated generally by reference numeral 64. Seats 68 are indicated in phantom lines in the space 64. The outer edges 70 of the side wall portions 60 are each inclined downwardly from the upper edge 72 toward the opposite end wall of the compartment, or toward the right as viewed in FIGS. 1 and 2. Similarly, the body portion 34 has side wall portions 74 extending from the end wall 76 thereof to define a passenger seat receiving space 78. Seats 80 are mounted within the space 78. The outer edges 58 of the side wall portions 74 are also inclined downwardly from the upper edge 56 of the end wall 76 toward the opposite end wall 62.

The trailing edges 82 and 84 of the side portions 24 and 26, respectively, are inclined complementally with the outer edges 70 and 58, respectively, of the associated side portions 60 and 74 of body portions 32 and 34, and the trailing edges 82 and 84 overlie the outer edges 70 and 58 in the closed position of the movable sections as shown in FIG. 1 so that the passenger compartment is completely enclosed during transit.

The movable sections 16 and 18 may be actuated by any conventional power means between their open and closed positions. FIGS. 1 and 2 illustrate in phantom lines a suitable actuating mechanism in the form of a pair of pulleys or sprockets 88 on which is mounted a belt or chain 90. The upper run of chain 90 is attached by a connector 92 with carriage 42 of the section 16 and the lower run of chain 90 is secured by a connector 94 with carriage 42 of section 18 such that rotation of the pulleys causes the sections 6 and 18 to move in opposite directions. One of the pulleys 88 may, of course, be connected with any conventional drive means such as an electric motor with limit switches engageable by the carriages 42 or other structure of the movable sections for turning the electric motor on and off. Other conventional actuating means such as air cylinders or hydraulic cylinders or the like may be employed for actuating the movable sections 16 and 18 between the positions shown in FIGS. 1 and 2.

Figure 6:
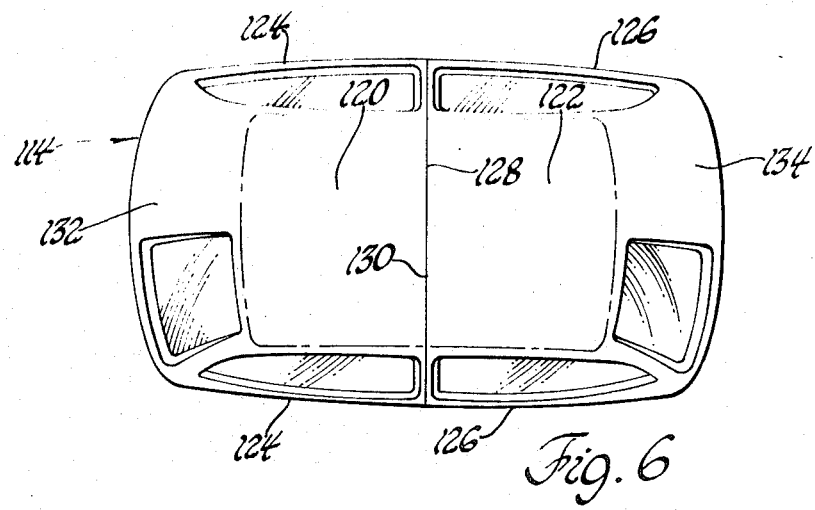
FIG. 6 is a top plan view taken on line 6—6 of FIG. 1.
Figure 7:
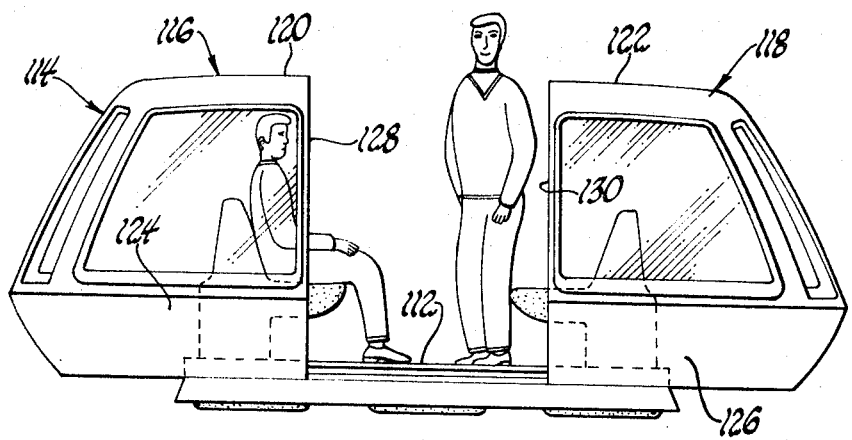
FIG. 7 is an elevational view of the vehicle of FIG. 5 with the passenger compartment opened to permit unobstrcucted access to the passenger compartment.

With reference to the embodiment shown in FIGS. 5 through 7, the vehicle body includes a base portion 100 having a horizontal floor surface 112 and enclosure means designated collectively by reference numeral 114 cooperating with the base portion 100 to define a passenger compartment therewith. The enclosure means 114 includes a pair of movable sections 116 and 118 each having top portions 120 and 122, respectively, and a pair of side portions 124 and 126, respectively, depending from the top portions. Sections 116 and 118 have opposed inner edges 128 and 130, respectively, and are movable relative to each other between the closed position shown in FIG. 1 in which the opposed inner edges 128 and 130 are in abutting engagement with each other such that the top portions 120 and 122 define the roof of the passenger compartment and overlie the entire surface of the floor 112, and the side portions 124 and 126 define the side walls of the passenger compartment; and an open position as shown in FIG. 7 in which the opposed inner edges 128 and 130 of sections 116 and 118, respectively, are separated to permit unobstructed ingress and egress to the passenger compartment between the spaced inner edges 128 and 130.

Enclosure means 114 includes portions defining end walls 132 and 134 for the passenger compartment which are integral with and extend between the side portions 124, 126 of said movable section. The base portion 100 may also include tracks along the sides thereof identical with those disclosed in the previous embodiment. Similarly, the embodiment of FIGS. 5 through 7 may include conventional power means for actuating the movable sections 116 and 118 between their open and closed positions such as is disclosed in connection with FIGS. 1 through 4.

Both embodiments have ground support means in the form of air cushion devices 96 and 136, respectively, for supporting the base portion above the surface over which the vehicle travels.

Thus, in the embodiment of FIGS. 1 through 4, the vehicle body comprises a base portion 10 having a horizontal floor surface 12 with air cushion devices 96 for supporting the base portion above a surface with a pair of axially spaced, complementary end sections 32 and 34 mounted on each end of the base and projecting upwardly therefrom and defining the end walls of a passenger compartment. A track 36 is defined on each side of base portion 10 between the end section 32 and 34, and a pair of movable closure sections 16 and 18 each having a top portion 20, 22 and a pair of side portions 24, 26 depending therefrom with the lower ends of the side portion slidably mounted on the tracks 26 supporting the movable sections for axial movement between the closed position as shown in FIG. 1 in opposed end-to-end engagement to cooperate with the end sections 32 and 34 and completely enclose the passenger compartment, and an open position in which the closure sections 16 are axially spaced from each other and straddle the respective end sections 32, 34 to provide unobstructed ingress and egress to the passenger compartment from either side thereof.

In FIGS. 5 through 7, the vehicle body includes a base portion 100 with a horizontal floor surface 112 and air cushion devices 136 for supprting the base portion above a surface. The enclosure means of the embodiment of FIGS. 5 through 7 includes a pair of open ended shell sections 116 and 118. Each of the shell sections have a top portion 120, 122 and a pair of side portions 124, 126 depending from the top portion. An end portion 132, 134 depends from the top portions 120, 122, respectively, and extends between the associated side portions 124, 126. The shell sections 116 and 118 are slidably mounted on the base portion 100 in opposed axial relationship for movement between the closed position of FIG. 5 in which the edges 128 and 130 of the top and side portions surrounding the open ends of the shells are in opposed, abutting relationship to completely enclose a passenger compartment with the base portion. The open position is shown in FIG. 7 in which the open ends of the shell sections are axially spaced from each other to provide unobstructed ingress and egress to the passenger compartment from either side of the base.

The above-described construction permits passengers to quickly enter and leave the passenger compartment in an erect or standing position while the vehicles have a low profile during transit to permit them to travel beneath low overhead structures with the passengers completely enclosed within the passenger compartment during transit.

While specific forms of the invention have been illustrated and described in the foregoing specification and accompanying drawings, it should be understood that the invention is not limited to the exact construction shown but that various alterations in the construction and arrangement of parts is possible without departing from the scope and spirit of the invention.

We claim:

1. A vehicle body comprising: a base portion having a horizontal floor surface; enclosure means cooperating with said base portion to define a passenger compartment therewith; said enclosure means including a pair of identical spaced body portions fixed to and projecting upwardly from said base portion to define the ends of said passenger compartment, and a pair of movable sections; each of said body portions having an end wall and side wall portions extending therefrom to define a passenger seat receiving space; said body portions beding disposed on said base portion in opposed relationship such that the passenger seat receiving space of one body portion faces the passenger seat receiving space of the other body portion; each of said movable sections having a top portion and a pair of side portions depending therefrom; said movable sections having opposed inner edges and being horizontally slidably movable relative to each other along said base portion between a closed position in which said opposed inner edges are engaged with each other such that the top portions extend between said body portions to define at least a portion of the roof of said passenger compartment and the side portions extend between said body portions to define at least a portion of the opposite side walls of said passenger compartment, and an open position in which each of said movable sections straddles one of said body portions such that the edge portion of the associated body portion is received within the space bounded by the inner surface of the movable section and the opposed inner edges of said movable section are separated to permit unobstructed ingress and egress to said passenger compartment between the spaced inner edges of said movable sections.

2. A vehicle body as claimed in claim 1 further including means defining a trackway on each side of said base portion, each side portion of said movable sections being slidably mounted on one of said trackways.

3. A vehicle body as claimed in claim 1 wherein the outer edges of the side wall portions of each of said body portions are inclined downwardly toward the opposite body portion.

4. A vehicle body as claimed in claim 3 wherein the trailing edges of the side portions of said movable sections are inclined complementally with the outer edges of the associated side portions of said body portions and overlie said outer edges in the closed position of said movable sections.

5. A vehicle body as claimed in claim 4 further including power means for moving said movable sections between the open and closed positions.

6. A vehicle body comprising: a base portion having a horizontal floor surface; enclosure means cooperating with said base portion to define a passenger compartment therewith, said enclosure means including a pair of spaced body portions each fixed to and projecting upwardly from said base portion to define the ends of said passenger compartment, and movable means for opening and closing said passenger compartment; each of said body portions having an end wall and side wall portions extending therefrom to define a passenger seat receiving space; said body portions being of the same size and configuration and disposed on said base portion in opposed relationship with the passenger seat receiving space of one body portion facing the passenger seat receiving space of the other body portion; said movable means including top and side portions and being horizontally slidably movable along said base portion between a closed position in which the top and side portions enclose the space between the body portions to define at least a portion of the roof and opposite side walls of the passenger compartment, and an open position in which the space between said body portions is uncovered to permit unobstructed ingress and egress to said passenger compartment.

7. A vehicle body as claimed in claim 6 wherein each of said body portions has an end wall and side wall portions extending therefrom to define a passenger seat receiving space, said body portions being disposed on said base portion in opposed relationship such that the passenger seat receiving space of one body portion faces the passenger seat receiving space of the other body portion.

8. A vehicle body comprising: a base portion having a horizontal floor surface; a track extending along each side of said base portion; at least one passenger seat fixedly mounted adjacent each end of said base portion with the seat at one end facing the seat at the other end and the space between said seats unobstructed; enclosure means cooperating with said base portion to define a passenger compartment therewith which encloses said seats; said enclosure means including a pair of movable sections; each of said movable sections having a top portion and a pair of integral side portions depending therefrom with the lowr ends of said portions slidably mounted on respective ones of said tracks; said movable sections having opposed inner edges and being movable along said tracks relative to each other between a closed position in which said opposed inner edges are engaged with each aother such that the top portions cooperate to define at least a portion of the roof of said passenger compartment and said side portions cooperate to define at least a portion of the opposite side walls of said passenger compartment; said enclosure means further including a pair of end portions cooperating with said top and side portions to define spaced end walls for said passenger compartment, said pair of end portions comprising a pair of spaced, identical body portions fixed to and projecting upwardly from said base portion, each of said body portions being straddled by one of the movable sections in the open position of said movable sections.

* * * * *